June 14, 1949. R. W. BYERLY 2,473,487
TIME-INTERVAL INDICATOR
Filed May 19, 1945
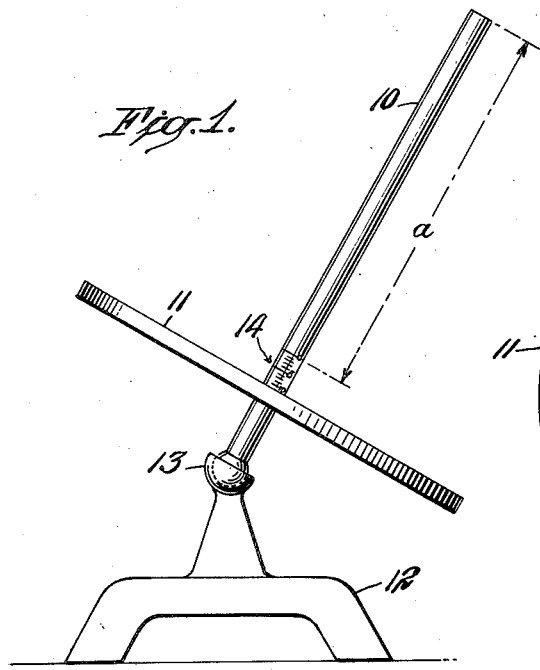
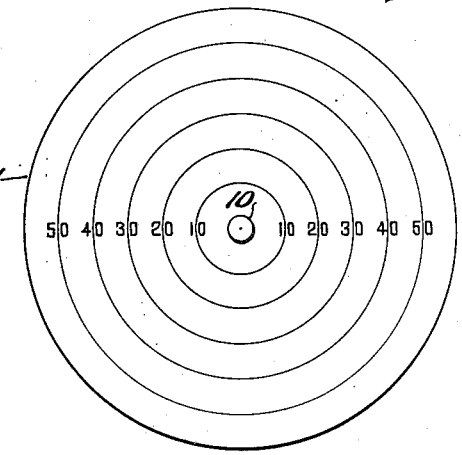
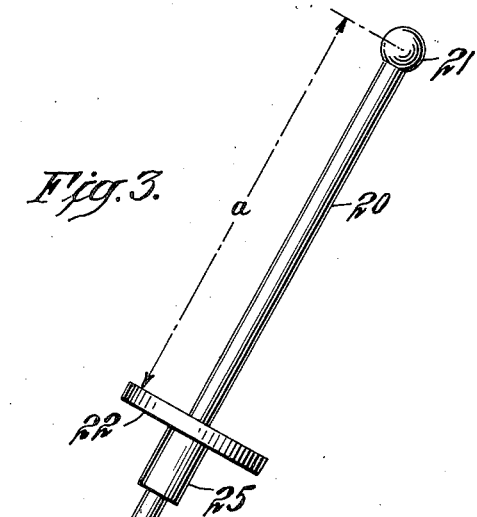
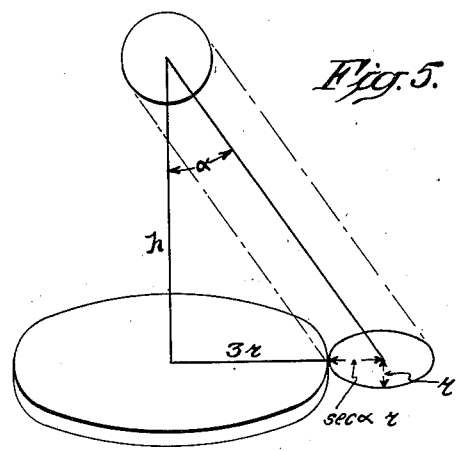
INVENTOR
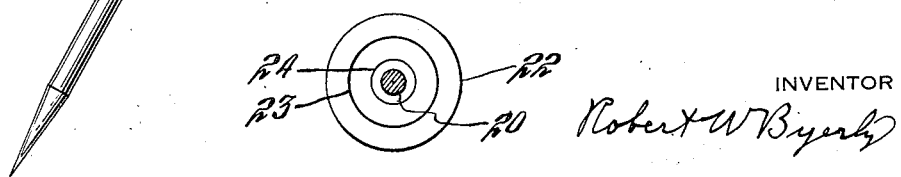
Robert W Byerly Patented June 14, 1949

2,473,487

UNITED STATES PATENT OFFICE 2,473,487

TIME-INTERVAL INDICATOR

Robert W. Byerly, New York, N. Y.

Application May 19, 1945, Serial No. 594,622

6 Claims. (Cl. 33—62)

This invention relates to a time-interval indicator.

A sundial, in order to indicate time and time intervals, must be designed with reference to the latitude of the place where it is to be used, and must be leveled and oriented to the meridian when it is set up.

The present invention avoids these inconveniences. It provides a device which may be used in any latitude and may be set up without reference to the horizon or to the meridian. It shows the movement of a shadow at the place on the earth where the sun is directly overhead at the moment when the device is set up, and indicates time intervals by the distances through which such a shadow moves without reference to the direction in which it moves.

The lenghtening of a shadow at a place where the sun is at the zenith provides a convenient measure of time intervals, as the rate of movement of the sun away from the zenith depends only upon the declination of the sun, and varies only slightly with extreme variations in declination. Thus, when the declination of the sun is zero, the sun moves 15° away from the zenith in one hour, and when its declination is maximum, 23° 27', it moves 13° 45'.5 from the zenith in one hour.

To make use of this phenomenon, the invention combines a shadow-casting element or style with a dial indicating the position of the shadow when the dial is set parallel to a plane which is horizontal at the place on the earth where the sun is at the zenith, and having concentric circles for indicating distances moved by the shadow from this position regardless of the direction in which it moves.

For a further explanation of the invention, reference is made to the accompanying drawings, in which Fig. 1 is a side view of a device embodying the invention;

Fig. 2 is a face view of the dial of the device shown in Fig. 1;

Fig. 3 is a side view of a simplified device embodying the invention;

Fig. 4 is a face view of the dial of the device shown in Fig. 3; and

Fig. 5 is a diagram showing how the relative dimensions of the device of Figs. 3 and 4 are determined.

The device shown in Figs. 1 and 2 has a cylindrical rod 10 and a circular dial 11. The rod is made universally adjustable by securing its lower end to a base 12 by a universal joint 13. It is held in adjusted position by friction in the universal joint or by a spring or set screw. The dial lies in a plane perpendicular to the rod and is adjustable on the rod to vary its distance from the upper end of the rod which serves as the shadow-casting element. The adjustability of the dial may be secured by giving it a tight sliding fit on the rod or by a screw thread connection between them.

The distance from the face of the dial to the end of the rod is indicated by a scale 14. In the form shown, the upper or zero end of the scale is at a distance $a$ from the upper end of the rod, and the scale has a length of $$\frac{a}{10}$$

which is divided into ten equal parts by graduations which may be numbered from 0 to 10.

The face of the dial 11 has concentric circular graduations marked to indicate ten-minute time intervals up to one hour. The radius of each circle is $$R_t = a \tan t + r$$

where $t$ is the time interval indicated by the circle, expressed in degrees, and $r$ is the radius of the rod 10. Thus the radius of the one-hour circle (shown as the periphery of the dial) is $$R_{60} = a \cdot \tan 15° + r$$

In the use of the device, the distance, $d$, from the end of the rod to the dial is adjusted in accordance with the declination of the sun so as to make $$\tan^{-1}\left[\frac{a \cdot \tan 15°}{d}\right]$$

equal to the angular movement of the sun away from the zenith in one hour. At the equinoxes when the declination of the sun is zero, $d=a$, so that the dial is set at the zero mark of the scale 14. At the solstices when the declination of the sun is 23° 27', $d=1.095a$, so that the dial is set between the 9 and 10 marks of the scale 14. For intermediate dates, the setting may be determined from the following table:

| Dates | | Setting on Scale 14 |
|---|---|---|
| Jan. 1 | July 1 | 9 |
| 10 | 12 | 8 |
| 18 | 20 | 7 |
| 24 | 27 | 6 |
| 31 | Aug. 3 | 5 |
| Feb. 6 | 9 | 4 |
| 12 | 16 | 3 |
| 19 | 23 | 2 |
| Mar. 2 | Sept. 4 | 1 |
| 20 | 23 | 0 |
| Apr. 8 | Oct. 11 | 1 |
| 19 | 22 | 2 |
| 26 | 29 | 3 |
| May 3 | Nov. 5 | 4 |
| 9 | 11 | 5 |
| 16 | 17 | 6 |
| 23 | 24 | 7 |
| 31 | Dec. 2 | 8 |
| June 11 | 12 | 9 |
| 21 | 21 | 9.5 |
| 30 | 31 | 9 |

After the dial has been set on the scale 14 in accordance with the date, the rod 10 is tipped to direct it toward the sun so that the rod casts no shadow, that is, so that the shadow of the circular upper end of the rod is coincident with the hole in the dial through which the rod passes. This places the dial perpendicular to the rays of the sun so that it is parallel to a plane which is horizontal at the place on the earth where the sun is at the zenith. Time intervals from the moment of setting may then be read from the position of the end of the shadow of the rod on the dial.

The accuracy of the device depends only on the accuracy with which it is made and the accuracy with which the position of the shadow is read. The extent of the longitudinal adjustment of the dial is so small that minor errors in this adjustment do not appreciably affect the accuracy of the shadow readings.

Figs. 3 and 4 show a simplified device having no relatively movable parts. It consists of a rod 20 with a ball 21 fixed on its upper end, and a circular dial 22 fixed on the rod at a distance from the ball. Two circles, 23 and 24, are marked on the dial. The lower end of the rod may be pointed to facilitate sticking it into sand or soft ground, and a handle 25 may be provided under the dial.

The device is used by grasping the handle 25, pointing the rod towards the sun so that the shadow of the ball is coincident with the inner circle 24 of the dial, and thrusting the point into the ground to hold it in this position. It then indicates the lapse of fifteen-minute intervals up to one hour, as follows:

15 minutes: Shadow of ball reaches circle 23
30 minutes: Shadow of ball reaches periphery of dial
45 minutes: Shadow of ball leaves circle 23
60 minutes: Shadow of ball leaves dial The operability of the device depends upon the relation between its dimensions. The fundamental dimension, $r$, is the radius of the circular shadow which the ball 21 casts on the dial when the dial is in a plane perpendicular to the sun's rays. $r$ is therefore approximately equal to the radius of the ball 21.

The radius of the circle 24 is $r$, that of the circle 23, $2r$, and that of the dial $3r$. The distance $h$ from the center of the ball 21 to the face of the disc is $15.76r$. This distance is determined as follows:

$$\tan \alpha = \frac{(3 + \sec \alpha) r}{h}$$

where $\alpha$ is the angle at the center of the ball between the axis of the rod and the center of the shadow of the ball on the plane of the dial when the shadow is in the sixty-minute position, that is, externally tangent to the periphery of the dial (Fig. 5). $\alpha$ is thus the angle through which the sun moves to move the shadow from its zero position to its sixty-minute position.

At the equinoxes, the sun moves 15° 00′ from the zenith in an hour, and at the solstices 13° 45′.5. If $\alpha$ is made 15° 00′, $h$ will equal $15r$. In this case, the device will indicate one hour correctly at the equinoxes but will be 5½ minutes slow at the solstices. If, on the other hand, $\alpha$ is made 13° 45′.5, making $h$ equal $16½r$, the hour indication of the device will be correct at the solstices but 5½ minutes fast at the equinoxes. To minimize the maximum error, $h$ should be made intermediate between $15r$ and $16½r$.

By choosing 14° 21′ as the value of $\alpha$, the maximum error is made as small as possible, for at the equinoxes the sun moves through this angle in 1 hr. − ($2^m$ $36^s$) and at the solstices in 1 hr. + $2^m$ $36^s$.

Making $\alpha = 14° 21′$ in the above equation gives the solution $h = 15.76r$. The angles corresponding to the fifteen-, thirty-, and forty-five-minute positions of the shadow are fixed by this ratio between $h$ and $r$, so that the maximum errors for them may be computed. They are as follows:

| Time indicated by device | Actual time | |
|---|---|---|
| | at equinoxes | at solstices |
| 15 m. | $15^m - 0^m 48^s$ | $15^m + 0^m 18^s$ |
| 30 m. | $30^m - 1^m 24^s$ | $30^m + 1^m 16^s$ |
| 45 m. | $45^m - 1^m 40^s$ | $45^m + 2^m 12^s$ |
| 60 m. | $60^m - 2^m 36^s$ | $60^m + 2^m 36^s$ |

At all other dates, the errors will be less.

The device thus indicates fifteen-minute intervals with a maximum error of about $\frac{1}{20}$, and is thus sufficiently accurate for timing many outdoor activities such as sun-baths, sea-baths, exercise periods, etc.

What I claim is:

1. A time-interval indicator, comprising a circular shadow-casting element, a dial having a circle indicating the position of the shadow when the dial is in a plane perpendicular to the sun's rays and time graduations consisting of circles concentric with said circle, and means under the dial for supporting it in a plane inclined to the horizontal.

2. A time-interval indicator, comprising a base, a cylindrical rod, a universal joint connecting the lower end of the rod with the base, a dial longitudinally adjustable on said rod throughout the interval between a distance $a$ from the end of the rod and a distance $1.1a$ from the end of the rod, the dial having time-interval graduations consisting of concentric circles centered on the axis of the rod to indicate time-intervals, the radius of each circle being equal to $a$ times the tangent of the angle corresponding to the time-interval indicated by that circle plus the radius of the rod.

3. A time-interval indicator, comprising a circular shadow-casting element, a dial in fixed relation to said element having a circle indicating the position of the shadow when the dial is in a plane perpendicular to the sun's rays and time graduations consisting of circles concentric with said circle and each radially distant therefrom by a distance intermediate between the distance which the shadow moves at the equinoxes in the time-interval represented by that circle and the distance which it moves at the solstices and the interval, and means under the dial for supporting it in a plane inclined to the horizontal.

4. A time-interval indicator, comprising a rod, a ball on one end of the rod, a circular dial fixed on the rod and bearing two concentric circles, in which the radius of the dial is $3r$, the radii of the circles on the dial are $r$ and $2r$, and the distance from the center of the ball to the face of the dial is intermediate between $15r$ and $16\frac{1}{2}r$, where $r$ is the radius of the circular shadow of the ball on the dial when the dial is perpendicular to the sun's rays.

5. A time-interval indicator, comprising a rod, a ball on one end of the rod, a circular dial fixed on the rod and bearing two concentric circles, in which the radius of the dial is $3r$, the radii of the circles on the dial are $r$ and $2r$, and the distance from the center of the ball to the face of the dial is $15\frac{3}{4}r$, where $r$ is the radius of the circular shadow of the ball on the dial when the dial is perpendicular to the sun's rays.

6. A time-interval indicator, comprising a rod having a pointed lower end, a ball on the upper end of the rod, a circular dial fixed on the rod between its ends and bearing two concentric circles, and a handle fixed on the rod below the dial, in which the radius of the shadow of the ball on the dial, the radii of the circles, the radius of the dial, and the distance from the center of the ball to the face of the dial are related by the ratio: $1:1:2:3: (15\frac{3}{4}\pm\frac{1}{2})$.

ROBERT W. BYERLY.

REFERENCES CITED

The following references are of record in the file of this patent:

FOREIGN PATENTS

| Number | Country | Date |
|---|---|---|
| 442,088 | France | June 12, 1912 |

Certificate of Correction

Patent No. 2,473,487 June 14, 1949

ROBERT W. BYERLY

It is hereby certified that errors appear in the printed specification of the above numbered patent requiring correction as follows:

Column 1, line 18, for "lenghtening" read *lengthening*; column 5, line 11, for "solstices and the" read *solstices in said*;

and that the said Letters Patent should be read with these corrections therein that the same may conform to the record of the case in the Patent Office.

Signed and sealed this 7th day of February, A. D. 1950.

[SEAL]

THOMAS F. MURPHY,
*Assistant Commissioner of Patents.*